Patented Oct. 4, 1949

2,483,748

UNITED STATES PATENT OFFICE 2,483,748

FLUID PHOSPHATIDE COMPOSITION

Harold Wittcoff, Minneapolis, Minn., assignor to General Mills, Inc., a corporation of Delaware No Drawing. Application April 25, 1947, Serial No. 744,039

5 Claims. (Cl. 252—1)

The present invention relates to a phosphatide composition which is sufficiently non-viscous so that it can be poured at room temperature. The invention also relates to a process of producing such a composition.

Commercial phosphatide compositions are usually mixtures of phosphatides and fatty oils, the latter in many instances constituting almost half of the composition. These commercial phosphatide compositions are generally waxy solids which are extremely difficult to handle and which are very difficult to disperse in the media in which they are to be used. Typical of the present day commercial lecithin composition is soybean lecithin. This is obtained by adding water to soybean oil, which results in the hydration of the lecithin, whereupon the lecithin precipitates in the form of a sludge. This sludge is generally separated by centrifugation, after which it is dried under reduced pressure to obtain the mixture which is commercial lecithin. Lecithin in this form contains as much as 45% soybean oil together with cephalin, lecithin, carbohydrates, pigments, and the like. In some instances the soybean oil may be removed by acetone extraction and then replaced by cacao butter. In either event, the product has the consistency of wax and is very inconvenient to use.

One attempt to overcome the difficulty of dispersing the lecithin is that described in U. S. Patent No. 2,194,842. According to this patent, the addition of free fatty acids such as stearic acid serves to convert the waxy lecithin composition into a fluid product. The patentee mentions the addition of 10-20% of free fatty acid for this purpose. Moreover the patentee recognizes that free fatty acid is useful in reducing the viscosity of lecithin only if a large quantity of fatty oil is also present. He states that free fatty acids are entirely without value where the phosphatide composition is oil-free.

This attempted solution of the problem is subject to two major objections. In the first place, the product is greatly diluted, first by the oil which is necessarily present, and also by the large quantity of free fatty acids necessary. Secondly, the addition of free fatty acid raises the acid number of the product to a point which renders the product unsuitable for many purposes, since many uses of lecithin require a composition having an acid number of 5-10.

It has now been found that the lower aliphatic esters of fatty acids, particularly the esters of unsaturated fatty acids, may be used to produce a phosphatide composition sufficiently fluid so that it pours at room temperature with ease. The aliphatic esters may be incorporated directly into the usual commercial phosphatide product containing phosphatides, fatty oil, and other substances, or they may be incorporated in a phosphatide product from which the fatty oil has been removed by acetone extraction or in any other manner. In either case the product which is obtained flows readily at room temperature and disperses easily and thoroughly throughout aqueous or oily media. When a phosphatide composition is employed which is oil-free, it has been found that the concentration of phosphatides may be as high as 80%, the remaining 20% being composed of aliphatic esters, and these compositions flow freely and easily. Thus according to the present invention, it is possible to produce high concentration phosphatide compositions which flow freely and easily, and which possess low acid numbers such that they can be used in all applications.

The esters which have been found particularly effective are the methyl esters of soybean oil acids. However any other aliphatic esters, such as the ethyl, propyl, isopropyl, butyl, and the like esters, may be used. Similarly considerable variation is possible in the acid group of the esters. Thus the acids resulting from the hydrolysis of any drying or semi-drying or liquid non-drying oil, such as tung, perilla, oiticica, linseed, corn, cottonseed, castor, palm, cocoanut, and the like oils may be used. In addition, pure esters, such as methyl oleate, methyl elaidate, methyl linoleate, methyl palmitoleate, methyl laurate, methyl stearate, and the like, or other aliphatic esters of these acids, may be used.

The folowing examples will serve to illustrate the invention.

Example 1

Ordinary commercial soybean phosphatides of wax-like consistency were stirred with acetone to remove the oil. After several such washings, a granular material remained. To 210 parts of this oil-free product was added 90 parts of the methyl esters of soybean fatty acids. The mixture was stirred and heated slightly with methanol in which both components were soluble. Removal of the methanol yielded a 70% solution of phosphatides in the methyl esters. This composition flowed readily at room temperature, and was shown by the Gardner bubble viscosity method to have a viscosity at 25° C. of Z-3.

Example 2

Ordinary commercial soybean phosphatides of wax-like consistency (200 parts) were mixed with 10 parts of the methyl esters of soybean fatty acids. The mixture was heated and stirred on the steam bath until the methyl esters were uniformly dispersed. The resulting composition, which flowed at room temperature, was shown by the Gardner bubble viscosity method to have a viscosity at 25° C. of Z-4 to Z-5.

*Example 3*

The experiment of Example 1 was repeated with 210 parts of oil-free lecithin and 90 parts of butyl oleate. The resulting product, which contained 70% phosphatide, showed a viscosity by the Gardner bubble viscosity method of Z-2 to Z-3 at 25° C.

*Example 4*

A mixture of 24 parts of oil-free lecithin, obtained by removing the oil entirely with acetone, and 6 parts of the ethyl esters of linseed fatty acids were mixed and heated in the presence of a small amount of benzene. When solution occurred, the solvent was removed by evaporation under reduced pressure. The resulting product flowed readily at room temperature. This composition comprised an 80% solution of lecithin.

Larger quantities of methyl esters may be used and these will produce correspondingly greater decreases in viscosity. If desired, the methyl esters may be incorporated at any convenient stage in the preparation of the commercial product. Thus, for example, they may be added to the phosphatide sludge prior to the removal of the water.

While various modifications of the above invention have been described, it is to be understood that the same is not limited thereto, but may be varied within the scope of the following claims.

I claim as my invention:

1. A phosphatide composition, comprising a major proportion of a phosphatide material and at least 5% of an ester of a lower aliphatic monohydric alcohol and a higher fatty acid, sufficient to soften and control the consistency of said composition.

2. A phosphatide composition, comprising a major proportion of a phosphatide material and at least 5% of an ester of a lower aliphatic monohydric alcohol and the mixed fatty acids of a fatty oil, sufficient to soften and control the consistency of said composition.

3. A phosphatide composition, comprising a major proportion of a phosphatide material and at least 5% of a methyl ester of the mixed fatty acids of a fatty oil, sufficient to soften and control the consistency of said composition.

4. A phosphatide composition, comprising a major proportion of a phosphatide material and at least 5% of a methyl ester of a higher fatty acid, sufficient to soften and control the consistency of said composition.

5. A phosphatide composition, comprising a major proportion of a fat-free phosphatide material and at least 5% of an ester of a lower aliphatic monohydric alcohol and a higher fatty acid, sufficient to soften and control the consistency of said composition.

HAROLD WITTCOFF.

REFERENCES CITED

The following references are of record in the file of this patent:

UNITED STATES PATENTS

| Number | Name | Date |
|---|---|---|
| 2,194,842 | Wiesehahn | Mar. 26, 1940 |
| 2,402,690 | Stanley | June 25, 1946 |